Feb. 19, 1957 A. WORMSER 2,781,915
APPARATUS FOR SCREENING AND COMMINUTING
Filed June 8, 1953 3 Sheets-Sheet 1
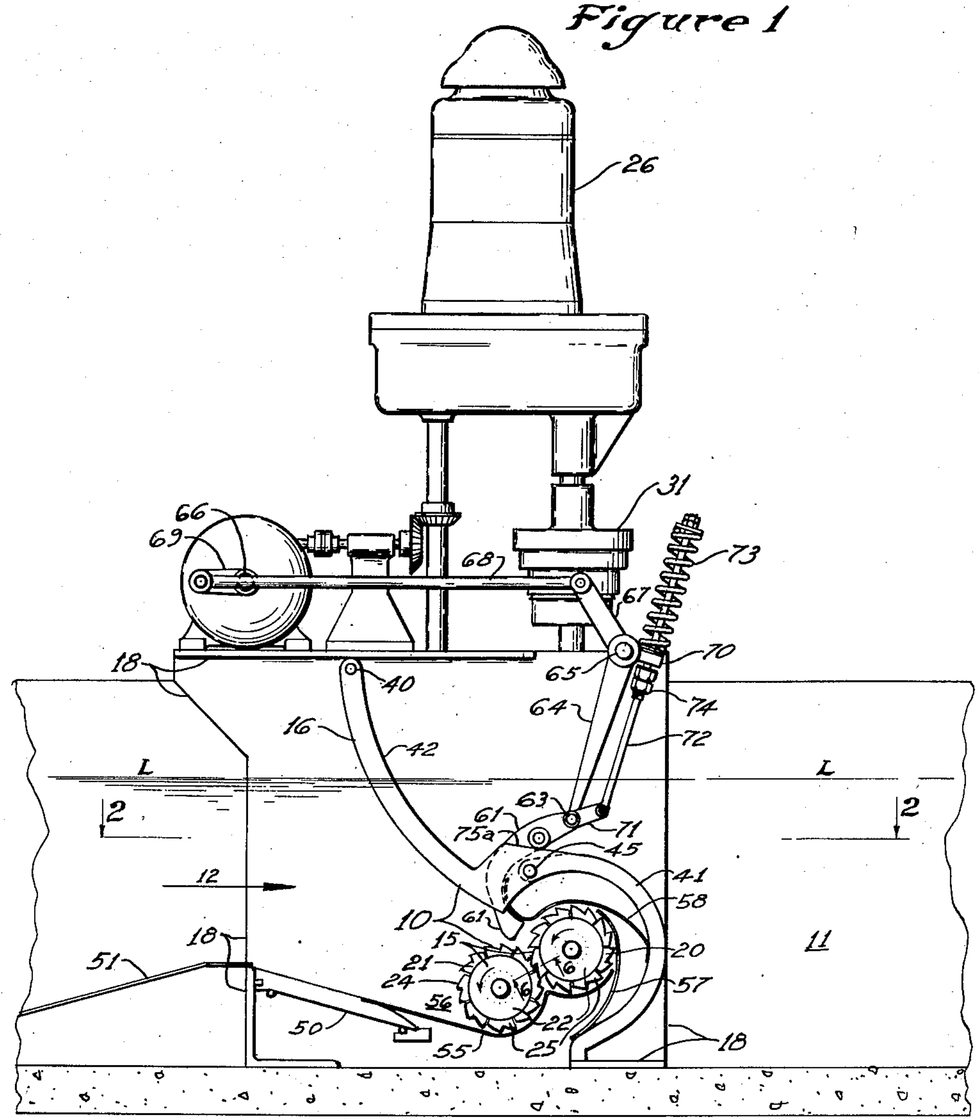
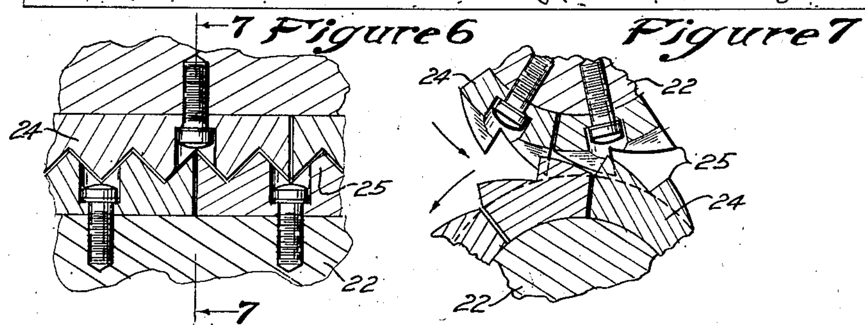

Feb. 19, 1957 A. WORMSER 2,781,915

APPARATUS FOR SCREENING AND COMMINUTING

Filed June 8, 1953 3 Sheets-Sheet 2

68
67
73
66
69
40
65
70
74
60
72
64
71
61
63
45
75
44

Feb. 19, 1957 A. WORMSER 2,781,915
APPARATUS FOR SCREENING AND COMMINUTING
Filed June 8, 1953 3 Sheets-Sheet 3
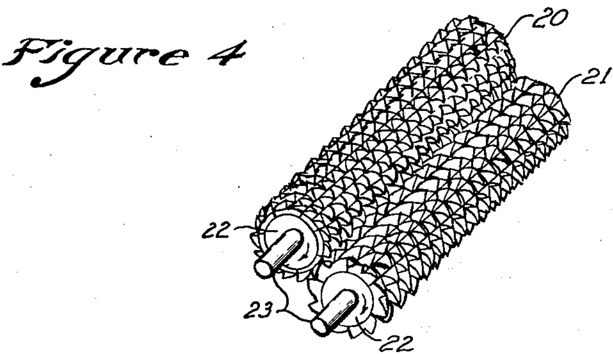
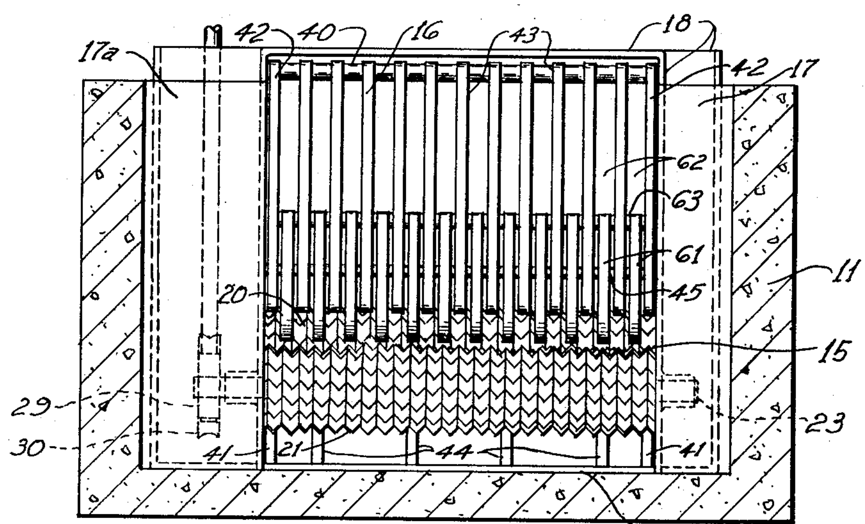
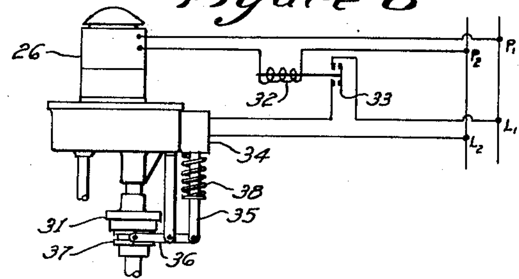

United States Patent Office 2,781,915

Patented Feb. 19, 1957

2,781,915

APPARATUS FOR SCREENING AND COMMINUTING

Arthur Wormser, Tucson, Ariz., assignor to Infilco Incorporated, Tucson, Ariz., a corporation of Delaware Application June 8, 1953, Serial No. 360,039

14 Claims. (Cl. 210—152)

This invention relates to an apparatus for intercepting solids in a flowing stream of liquid, such as, for example, sewage or other liquid wastes, and comminuting them.

A main aspect of the invention is a new comminutor which may be installed above or below the liquid level.

Another aspect of the invention lies in providing an improved combination of a screen and submerged comminutor.

It is an object of the invention to provide a novel comminutor.

Another object is to provide a comminutor including two rotating members provided with projections, said members cooperating in a novel manner to comminute material by a tearing, splitting, and ripping action.

Another object of the invention is to provide novel means operative to partially or wholly disengage a driven member from its drive means when overload occurs, and to automatically re-engage it with its drive means when the load returns to normal.

Another object is to provide a comminutor including two rotatable members cooperating to comminute material, and means operative under overload conditions to momentarily disengage one of said members from its drive while the other continues to rotate, and to automatically re-engage said one member with its drive when overload ceases.

Another object of the invention is to provide an improved apparatus for intercepting in a flowing stream of liquid solids exceeding a predetermined size and comminuting the intercepted solids.

Another object is to provide with a submerged comminuting device means for positively moving material to be comminuted to the comminuting parts of the device.

Another object is to provide with a comminutor means for retaining the material in position to be acted upon by the comminutor for a predetermined period of time.

Other objects will become apparent upon consideration of the detailed description and of the claims which follow.

Many liquids, and particularly sewage, contain materials, such as rags, large pieces of wood or metal, glass bottles, and the like, which must be removed, or reduced in size, before the liquid can be permitted to enter a treating plant. For many years bar screens have been provided in sewage channels to intercept larger solids. These screens were raked either manually or mechanically, and the screenings were either disposed of by burying, burning, and the like, or they were comminuted to suitable size and returned to the sewage. Another method of disposing of screenings which has become increasingly favored is by comminution below the liquid surface and without removing the screenings from the liquid.

In such underwater comminution the solids were usually intercepted by a rotatable screen, or a combination of a fixed screen and a series of disks rotatable in the screen slots, the screen or disks being provided with cutting teeth and cooperating with a cutter comb or bar with notches in the path of the cutting teeth. Such prior art comminutors have not been altogether satisfactory. Many larger objects, particularly pieces of wood, are often not properly caught and cut by the cutting mechanism, but remain floating on the liquid surface. Rags sometimes cause difficulties by passing through the comminutor without being cut up, or by being cut into long strings of material which can pass the screen but cause trouble in the pumps of the treating plant. In inspecting a great number of installations of underwater comminutors of different make, I have found in practically all cases at the side of the comminutor channel a large mass of debris piled up, including wood pieces which had not been accepted by the machine, but had stayed floating on the surface until they were removed manually, whole rags which had passed through the comminutor and been taken out of the downstream channel, and the like. It appeared to belong to the usual tasks of the works operator to remove these materials manually from time to time from the comminutor channel.

These shortcomings of prior art underwater comminutors are mainly due to their inadequate shearing method, and also in part to a lack of positive means for guiding the floating materials to the cutting parts of the machine and holding them in position to be effectively acted upon. It is a common characteristic of prior art comminutors that they rely for comminution on a scissor-like action between a stationary and a movable part, one of which has cutting teeth and the other cutting notches. In scissor action, cutting is effected by two blades with edges arranged opposite each other, and it is important, in order to obtain cutting, that the edges are pressed together. Due to the necessary clearance between stationary and moving parts, the cutting edges in such comminutors cannot be exactly aligned opposite each other and cannot be pressed together, and thus no true scissor action can be obtained. The necessary clearances between moving and stationary cutting edges in these devices permit, for example, a rag to flatten out and pass through between the teeth and the notches, or ribbon-like strips are pulled out, but no true comminution of such materials is usually obtained.

Instead of relying on scissor action and the conventional cooperation of a stationary and a movable cutting member, I use two movable comminuting members which are thus positioned and moved relative to each other, that one tends to move the material into the bite between the two members, while the other tends to move it out of the bite. As a result of the action of one of the comminuting members on the material to be comminuted thus opposing the action of the other, glass is crushed, while long grain wood is splintered and short grain wood is milled. In the case of rags the material is formed into a roll, which undergoes a two-step comminuting action. First, numerous holes are torn into the fabric, and thereafter small pieces of material are torn out, until the roll is completely disintegrated.

I have used my new comminutor successfully above as well as below liquid level. In either case material, such as pieces of wood, rags, glass bottles, metal cans, and the like, was chopped up into small pieces which could pass a normal bar screen, and in the case of submerged installation no unsightly floating material was left upstream of the comminutor.

When using the comminutor below water level, I have combined with it certain features which assure that the materials to be comminuted are positively guided to, and retained at, the place where the comminuting parts of the machine can act upon them.

In order to show and describe also these additional new features, the invention will be described in connection with a submerged comminutor in combination with a bar screen. It should, however, be understood that the use of the new comminutor is not limited to the particular type of installation shown and described for purposes of illustration, but can be used with advantage also for comminuting above the liquid level.

The invention will be more readily understood by reference to the drawings which form a part hereof and wherein like numerals in the several figures designate similar elements.

Figure 1 is a side elevation, with a part of the framing removed, of a screen and comminutor assembly according to the invention;

Figure 3 is a front elevation showing the screen and comminutor as seen from the upstream side;

Figure 4 is an isometric view of a comminutor according to the invention;

Figure 6 is a sectional view, on an enlarged scale, taken along line 6—6 of Figure 1;

Figure 7 is a sectional view, on an enlarged scale, taken along line 7—7 of Figure 6; and Figure 8 is a diagrammatic view of an overload device.

Figures 2, 5:
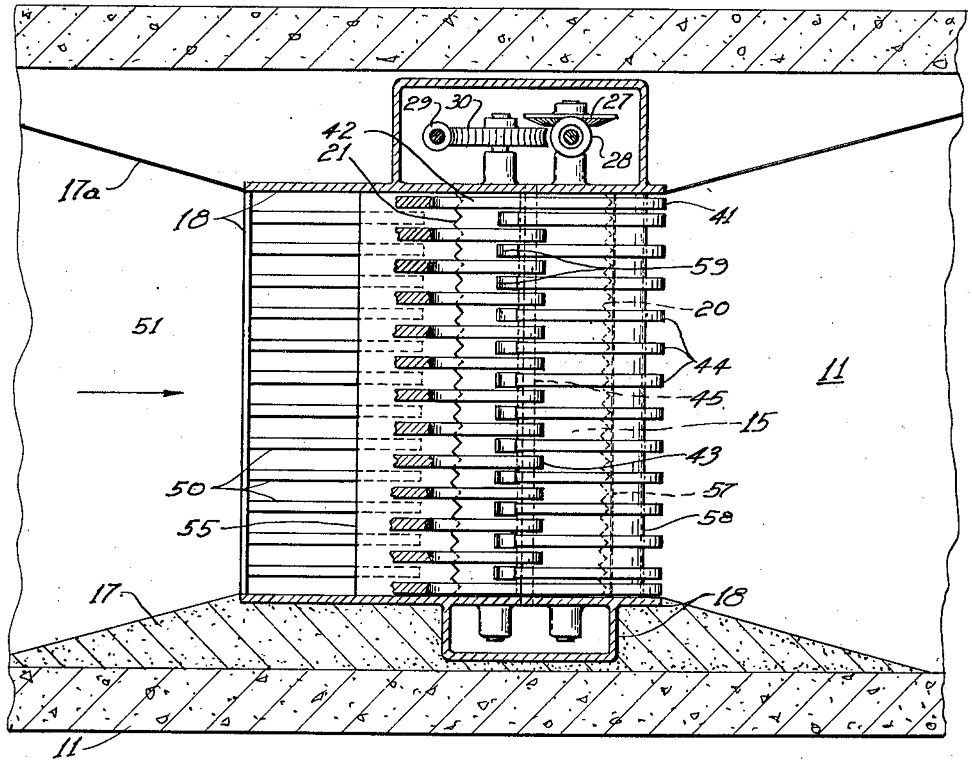
Figure 2 is a horizontal sectional view taken along line 2—2 of Figure 1 with the rake in its up-position.
Figure 5 is a diagrammatic partial vertical sectional view showing the rake and rake-moving mechanism in their lower and upper end positions.

As shown in Figures 1 to 3, a screen and comminutor assembly 10 is installed in a channel 11, the liquid flowing in the direction indicated by the arrow 12. Preferably the comminutor 15 is mounted in the lower portion of the channel as shown, so that it will be at least partly submerged even at the lowest flow through the channel 11, and the screen 16 extends from an elevation above the highest liquid level in the channel 11, indicated at L in Figure 1, downwardly to an elevation adjacent the comminutor. However, the respective locations of the screen and comminutor could be reversed. The screen and comminutor assembly 10 may extend across the entire channel width, but preferably a part of the width of channel 11 is blocked off by any suitable means, for example, concrete grouting, such as shown at 17, or by baffles, such as shown at 17*a*, in Figure 2, extending from the walls of the channel at a suitable angle to direct the stream of liquid toward the screen and comminutor. The entire assembly may be enclosed in a framework 18 and be installed in channel 11 as a unit.

A comminutor according to the invention comprises a pair of rollers 20 and 21 (best shown in Figure 4), arranged with their longitudinal axes parallel to one another. Each roller includes a cylindrical member 22, provided at each end thereof with a stub shaft 23. As best shown in Figures 6 and 7, segments 24 are fixed to the cylindrical member 22 and have spaced projections or teeth 25 on their circumferences. The projections 25 are arranged in different planes of rotation, and the axes of the rollers 20 and 21 are thus spaced apart that no point of the profile of one of the rollers interferes with any point of the profile of the other roller, and that the projections of one roller pass those of the other with small clearance. The projections 25 may have relatively blunt edges, as they are not relied on for scissor action.

The rollers 20 and 21 are both driven from a motor 26 but at different speeds. As shown in Figure 2, the roller 20 is driven by means of bevel gears 27 and 28, while the roller 21 is driven by means of a worm 29 and worm gear 30. The relative speeds may be about 5 to 1. While the slow roller 21 is driven with a positive drive, a friction clutch 31 is interposed in the drive of the fast roller 20. This friction clutch is set for a torque such that it slips when the resistance against rotation of the fast roller exceeds a predetermined value.

I may also provide an overload device which will completely, or almost completely disengage the friction clutch 31 in exceptional cases where the friction remaining after the clutch has started to slip is still too high; a novel overload device, which automatically re-engages the clutch when the overload ceases, is shown diagrammatically in Figure 8. An overcurrent relay 32 is provided in the power circuit $P_1$—$P_2$ through the motor 26. When energized by overcurrent, the relay 32 closes a switch 33. Closing of switch 33 closes a circuit from terminal $L_1$ to terminal $L_2$ through solenoid 34, energizing the solenoid. Plunger 35 of the solenoid is connected to a clutch-operating lever 36. When the solenoid 34 is energized and its plunger moves upwardly, the left end of lever 36, as seen in Figure 8, moves downwardly and pushes the sleeve 37 of the friction clutch downwardly, thus disengaging the clutch. When the overcurrent ceases, switch 33 opens, de-energizing the solenoid 34, and the lever 36 is moved back into clutch-engaging position by a spring 38, encircling an extension of the plunger 35.

To prevent that the clutch is re-engaged before the obstacle has been completely removed, a time delay, not shown, may be provided in the relay 32, to hold the switch 33 closed for a short period of time after overcurrent ceases.

The rollers 20 and 21 are driven in the same direction, either clockwise, as indicated by the arrows on the rollers in Figure 4, or counterclockwise, as indicated in Figure 1. In either case, at the closest point, or bite, of the rollers, the fast roller 20 moves downwardly, and the slow roller 21 moves upwardly. Therefore, the roller 20 tends to move material into the bite, while simultaneously the roller 21 tends to move it out of the bite, the bite being above the plane through the axes of the two rollers.

While the fast roller 20 is shown in the figures at a higher position than the slow roller 21, the position of the rollers may be reversed. Similarly, the bite can be made to occur at the underside of the rollers. Thus, if the position of the rollers in Figure 4 were reversed, with the slow roller 21 on the left and the fast roller 20 on the right, both turning clockwise, the bite would be at the underside of the rollers, the fast roller again moving the material into the bite and the slow roller moving it out of the bite.

The screen 16 is preferably curved, as shown in Figure 1, with a convex upstream face. The upper end of the screen 16 is supported from the framing 18 by any suitable means, such as by a cross bar 40. The lower end of the screen 16 is supported from the bottom of the framing 18 by curved bars 41, which are extensions of the end bars 42 of the screen 16 and may be integral therewith. In large screens also some of the intermediate bars 43 of the screen 16 are extended in this manner.

A set of curved bars 44 is hinged to a rod 45 which forms the lower end of the screen 16. As shown in Figure 2, there may be a bar 44 between each pair of the bars of the screen 16, so that a complete lower bar screen is formed. Normally, however, only a few bars 44 will be provided, as indicated in Figure 3.

Upstream of the comminutor 15 a screen 50 is removably supported in generally horizontal position from the frame work 18, as shown in Figure 1. A plate 51, likewise supported on the frame work 18, as shown in Figure 1. A plate 51, likewise supported on the frame work 18, forms a ramp leading to the screen 50. The screen permits grit to pass around the comminutor with a portion of the liquid, but retains all material which should be comminuted. Affixed to the screen 50 is a plate 55 of resilient material, such as, for example, spring brass, whose left hand part (as seen in Figure 1) forms with the slow roller 21 a wedge-shaped space 56 and whose right hand portion closely underlies the two rollers 20 and 21 and is shaped to conform to their configuration. A second plate 57, also of resilient material, is attached with its lower end to the bars 44 and extends beyond the upper end of plate 55 and along a further portion of the roller 20. A third resilient plate 58 is also affixed with its lower end to the bars 44 at a higher elevation than the plate 57 and extends beyond the upper end of the plate 57 and along the top of the fast roller 20. The upper end of plate 58 is pronged and forms in effect an extension of, or auxiliary screen to, the bar screen 16, the prongs 59 of the plate 58 interlacing with the bars 43 of the screen 16, as shown in Figure 2. The plates 57 and 58 are shown for purposes of clarity with their ends slightly spaced, but actually they are in contact with one another and form in effect a solid wall around the rollers 20 and 21.

One purpose of the plates 55, 57, and 58 is to hold material to be comminuted closely to the rollers 20 and 21, whereby the material will be moved by the rotation of the rollers upwardly around the rollers and into their bite. The plates are made of resilient material to permit limited movement away from the rollers and allow passage of larger than normal pieces of material.

Another purpose of this wall is to prevent escape of uncomminuted material to the downstream portion of the channel, the only way material can reach the downstream portion being by passing through screen 16 or the interlacing prongs 59.

While the wall is shown as formed by solid plates, perforated plates or screens can be used instead, in which case the liquid and comminuted material can pass directly to the downstream portion of the channel, while uncomminuted material will be retained.

Due to the fact that the curved bars 44 are hinged to the bar screen 16, the plates 57 and 58, which are fastened to the bars 44, can be swung away from the rollers.

Material intercepted by the screen 16 is moved along the screen to the comminutor 15 by a reciprocable rake 60 which has a rake member 61 for each opening 62 between bars of the screen 16. The rake members 61 extend through the openings 62 from the downstream side of the screen, and have their tips on its upstream side. The rake members 61 are keyed to, and supported by, a shaft 63, which in turn is hingedly supported at its ends by arms 64. The arms 64 are keyed to a shaft 65. A reciprocating motion is imparted to shaft 65 from a continuously turning shaft 66 to which it is connected by means of an arm 67, connecting rod 68, and crank 69. The shaft 66 is driven counterclockwise at constant speed by any suitable means, such as from a speed reducer connected to the motor 26 by suitable transmission gearing, as shown.

Each arm 64 has a rearward projection 70, and the two outermost rake members have each a projection 71. Each projection 71 is hinged to a spring rod 72, which is urged upwardly by a spring 73 whose lower end abuts the projection 70 of the respective arm 64. Upward motion of each spring 73 is limited by an adjustable locknut 74, which in normal position touches the respective projection 70.

Due to this construction the arms 64 and rake members 61 normally move in unison on their upward and downward trip, and a motion of the rake members 61 relative to the arms 64, due to the hinging of shaft 63, can be only in clockwise direction. Such a relative motion of the rake members to the arms 64 happens when motion of the crank 69 tends to move the rake 60 downwardly, while the rake members 61 are prevented from following.

In normal operation I utilize the ability of the rake members 61 to a relative motion with regard to the arms 64 to provide a dwell, or time of rest, for the rake members in their lowermost position during each cycle of reciprocation. The cycle of rotation of the crank 69 and the cycle of reciprocation of the rake 60 are thus proportioned that the rake reaches its predetermined lowermost position, a short distance from the fast roller 20, when the crank 69 is in the position shown in full lines in Figure 5. In this position of the rake members, one of them contacts a stop member 75, which prevents the rake members 61 from being further lowered. As the crank 69 continues to rotate counterclockwise, the arms 64 keep moving downwardly and to the right (counterclockwise), but the stop 75 prevents the rake members 61 from following, whereby the springs 73 are compressed and the rake members are held in their down position. When a simple stop 75 is used, such as shown in Figure 5, the rakes will be swung clockwise and upwardly. By providing a cam face on the rake member cooperating with stop member 75, or a cam-shaped stop 75a as shown in Figure 1, this motion can be almost completely eliminated, so that the rake members remain in position adjacent the fast roller 20, while the crank moves from the position shown in Figure 5 to the position shown in Figure 1. Upon continued rotation of the crank the rake is moved upwardly to the position shown in dotted lines in Figure 5.

Another purpose of hinging the shaft 63 is to allow the rake members 61 to swing rearwardly to within, or behind, the bar screen 16, to pass an obstacle which may be pinched in the screen or in front thereof.

The operation will be readily understood. As the liquid flows through the channel 11, material which cannot pass the screens 16 or 50 is carried directly to the comminutor 15, or is intercepted by the screen 16 and raked downwardly to the bite of the rollers. There the material is subjected to the opposing actions of the two rollers, the fast roller 20 tending to move the material into the bite and the slow roller 21 tending to move it out of the bite. By this action wood is splintered or milled, depending on the direction of its grain, and glass is crushed. Rags entering the bite of the rollers are quickly formed into a roll, into which first numerous holes are torn; then small pieces are torn out of the fabric, until the material is completely disintegrated.

The tendency of the fast roller 20 to push material into the bite and the tendency of the slow roller 21 to take them out of the bite is not always exactly balanced. When the slow roller overcomes the tendency of the fast roller, it moves the material out of the bite with very great force. When material is thus thrown out of the bite, the rake members, due to the hinging of the shaft 63, can swing upwardly and clear the path for the material.

Floatable material getting out of the bite before it is sufficiently comminuted to pass the screen is carried to the liquid surface, only to be caught again by the rake 60 on its next cycle, and returned to the bite of the rollers for further comminution. Objects which are heavier than water, such as wet rags, sink down into the wedge-shaped space 56, and are there caught between the slow roller 21 and the resilient plate 55 and are kept in contact with the rotating rollers by the plates 55, 57, and 58 and thus returned to the bite of the rollers.

For best operation it is desirable that material to be comminuted which has reached the vicinity of the bite be held there for a short period of time to prevent its escape before it has been acted upon by the rollers. This is particularly true in the case of floating material, such as pieces of wood, which might float up to the liquid surface if the rake 60 started its upward return trip immediately after reaching its lowermost point. Due to the dwell provided for the rake members 61 in their lowermost position, materials are held by the rake members in proximity to the bite of the rollers for a predetermined period of time during each cycle of reciprocation of the rake.

An object which has been drawn into the bite by the fast roller may become wedged or otherwise caught in a position between the rollers where it resists rotation of the fast roller, while the slow roller is unable to move it out of the bite. When the resistance to the rotation of the fast roller 20 has reached the predetermined value for which the clutch 31 is set, the clutch slips until the slow roller, which continues to rotate, has moved the wedged piece away from the bite, and the resistance to the rotation of the fast roller has dropped to a normal value.

In case the resistance to rotation of the fast roller 20 is not eliminated after the clutch 31 has started slipping, the current consumed by the motor will exceed the limit corresponding to the friction for which the clutch is set. When, as a consequence of this overcurrent, the solenoid 34 acts to disengage the friction clutch completely, or almost completely, as described above, the slow roller 21 becomes the only driven part, and the fast roller 20 is free to turn in the opposite direction of the normal. The two rollers, therefore, now act like a driving and driven gear, and any obstacle between them is rolled away from the bite. When the obstacle starts being rolled away and the overcurrent ceases, switch 33 will remain closed for a short period of time, due to the time delay device, and thereafter will open, whereby solenoid 34 is de-energized, and the lever 36 is moved by spring 38 to re-engage the clutch.

Should any object accidentally become wedged between the roller 20 and the plates 57 or 58, it can be freed by swinging the curved bars 44, to which the plates 57 and 58 are affixed, rearwardly and upwardly. Similarly, the screen 50 with the plate 55 attached to it can be removed, to free any objects accidentally wedged between the plate 55 and the rollers. These operations are only contemplated as an emergency measure in connection with draining of the channel, as otherwise they would allow uncomminuted material to pass to the channel downstream of the comminutor and bar screen.

It will be understood that the invention is not limited to the exact construction of the embodiment shown and described for purposes of illustration and exemplification, but that various changes may be made without departing from the spirit and scope of the invention. Thus, for example, it will be obvious that instead of using resilient material for the plates 55, 57, and 58, the same effect can be obtained by using stiff plates which are hingedly supported and spring loaded. Similarly, while specific means have been disclosed for providing a dwell, and a specific novel overload device, other means of this general type could be substituted therefor.

I claim:

1. A comminutor comprising a pair of rollers mounted adjacent each other and having parallel longitudinal axes and spaced projections on their circumferences, and means for rotating said rollers about their longitudinal axes in the same direction but at different speeds, the projections on one of said rollers being arranged in different planes of rotation than the projections of the other roller and entering at the bite spaces between the projections of the other roller, and said rollers being mounted with their axes sufficiently spaced that no point of the profile of one of said rollers interferes with any point of the profile of the other roller during rotation of said rollers, the projections on said rollers being arranged in rows non-parallel to the longitudinal axes of said rollers and to one another at the bite of said rollers.

2. A comminutor comprising a pair of rollers, means for rotatably mounting said rollers with their longitudinal axes parallel to one another, spaced projections on the circumferences of said rollers, said projections being arranged in such planes of rotation and the axes of said rollers thus spaced from one another that no point of the profile of one of said rollers interferes with any point of the profile of the other roller during rotation of said rollers, and drive means including a motor and a power circuit through said motor for rotating said rollers about their longitudinal axes in the same direction but at different speeds, a friction clutch interposed in the drive means of the faster roller, and an overload device connected to said friction clutch and adapted to disengage said clutch in response to overcurrent in said power circuit.

3. A comminutor comprising a pair of rollers, means for rotatably mounting said rollers with their longitudinal axes parallel to one another, spaced projections on the circumferences of said rollers, said projections being arranged in such planes of rotation and the axes of said rollers thus spaced from one another that no point of the profile of one of said rollers interferes with any point of the profile of the other roller during rotation of said rollers, and drive means including a motor and a power circuit through said motor for rotating said rollers about their longitudinal axes in the same direction but at different speeds, a friction clutch interposed in the drive means of the faster roller, and an overload device connected to said friction clutch, said overload device including a clutch operating lever, a solenoid adapted, when energized, to move said lever to disengage said clutch, a spring adapted to move said lever to re-engage said clutch when said solenoid is de-energized, and means for energizing said solenoid in response to an overload in said power circuit.

4. Apparatus for intercepting solids in a flowing stream of liquid and comminuting them in said stream comprising the combination of a stationary bar screen, reciprocable rake members adapted to move solids intercepted by said screen along said screen, means for reciprocating said rake members, comminuting means positioned in said stream to receive said solids from said rake members, means operative to hold said rake members in their end position adjacent said comminuting means for a predetermined period of time during each cycle of reciprocation, and wall means adjacent and downstream of said comminuting means, said wall means being capable of limited movement away from said comminuting means.

5. The apparatus of claim 4 wherein said wall means have an extension providing an auxiliary screen member having bars interlaced with the bars of said bar screen.

6. Apparatus for screening solids from, and comminuting them in, a stream of liquid including a bar screen extending transversely of said stream of liquid partway its depth, comminuting means mounted adjacent said screen transversely of an unscreened portion of said stream, said comminuting means comprising two rollers rotatably mounted adjacent, and with their longitudinal axes parallel to, one another, said rollers having teeth protruding from their circumferences, in rows diverging from said axes and from one another at the bite of said rollers, said teeth being arranged in different planes of rotation so that at the bite the teeth of one roller enter the spaces between the teeth of the other and pass the teeth of the other roller with small clearance upon rotation of said rollers, means for rotating said rollers about their longitudinal axes in the same direction but at different speeds, rake means adapted to move material intercepted by said screen toward the bite of said rollers, and wall means downstream of said rollers preventing escape of uncomminuted material to downstream of said screen and comminutor.

7. Apparatus for screening solids from, and comminuting them in, a stream of liquid flowing through a channel comprising a bar screen mounted in said channel and extending transversely of said stream of liquid partway the height of said channel, a comminutor mounted adjacent said screen transversely of an unscreened portion of said stream, said comminutor comprising two rollers rotatably mounted with their longitudinal axes parallel to one another, said rollers having teeth protruding from their circumferences and arranged in diverse planes so that at the bite the teeth of one roller enter the spaces between the teeth of the other and pass the teeth of the other roller with small clearance upon rotation of said rollers, means for rotating said rollers in the same direction but at different speeds about their longitudinal axes, rake means adapted to move material intercepted by said screen toward the bite of said rollers, and wall means adjacent the downstream side of said rollers and adapted to hold material close to said rollers, whereby material entering the space between the rollers and said wall means is moved by said rollers to their bite, said wall means being capable of movement away from said rollers to permit passage of not fully comminuted material to the bite.

8. A screen-comminutor combination for installation in a liquid channel including a bar screen extending, when installed in operative position, transversely of said channel and partway its depth, a reciprocable rake, means for reciprocating said rake along said screen, and a comminutor extending, when mounted in said channel, transversely thereof at a lower elevation than said bar screen, characterized in that said comminutor comprises a pair of rotatable rollers having their longitudinal axes parallel on one another and transversely of said channel, projections on the circumferences of said rollers, drive means connected to said rollers for rotating said rollers in the same direction but at different speeds, said projections being arranged in such planes of rotation and the axes of said rollers being thus spaced from one another that at the bite during rotation of said rollers, the projections of one roller enter the spaces between the projections of the other and pass the projections of the other roller with small clearance and without interference by any point of the profile of one roller with any point of the profile of the other roller, and wall means adjacent the downstream side of said rollers and adapted to limited movement away from said rollers, said rake means in its lowermost position being adjacent the bite of said rollers.

9. The apparatus of claim 8 including also means for holding said rake means in said lowermost position for a predetermined period of time during each cycle of reciprocation of said rake means.

10. Apparatus for intercepting solids in a flowing stream of liquid and comminuting them comprising the combination of a straining wall interposed in said stream, traveling means adapted to cyclically travel along said straining wall and move solids intercepted by said straining wall along said wall, drive means for said traveling means, and comminuting means positioned to receive said solids from said traveling means, with wall means mounted on the downstream side of said comminuting means, said wall means being hingedly supported and spring loaded, whereby said wall means are normally held closely adjacent to said comminuting means but are capable of limited movement away from said comminuting means.

11. Apparatus for intercepting solids in a flowing stream of liquid and comminuting them, including a screening wall interposed in said stream, screen-cleaning means adapted to travel along said screen and move solids intercepted by said screen therealong, a comminutor positioned adjacent an end point of travel of, and receiving said solids from, said cleaning means, and means for cyclically reciprocating said cleaning means along said screen, said cleaning means being hingedly supported by said reciprocating means and reaching said end point before said reciprocating means has completed a cycle of reciprocation, means including a spring normally preventing relative motion between said reciprocating means and said cleaning means but permitting said cleaning means to swing in opposite direction of the movement of said reciprocating means, and stop means arresting movement of said cleaning means when it reaches said end point of travel and compressing said spring while said reciprocating means completes its cycle of reciprocation, whereby said cleaning means is held in said end position for a predetermined period of time during each cycle of reciprocation.

12. A comminutor comprising a pair of rollers, means for rotatably mounting said rollers with their longitudinal axes parallel to one another, spaced projections on the circumferences of said rollers, and means for rotating said rollers about their longitudinal axes in the same direction but at different speeds, said projections being arranged in rows diverging from said axes and from one another at the bite of said rollers, said projections being mounted in such planes of rotation, and the axes of said rollers being thus spaced from one another, that at the bite the projections of one roller enter the spaces between the projections of the other but that no point of the profile of one of said rollers interferes with any point of the profile of the other roller during rotation of said rollers.

13. Apparatus for screening solids from a stream of liquid and comminuting them, comprising a bar screen extending transversely of said stream of liquid, a comminutor mounted adjacent said screen, said comminutor comprising two rollers rotatably mounted adjacent, and with their longitudinal axes parallel to, one another, said rollers having teeth protruding from their circumferences in rows non-parallel to said longitudinal axes and to each other at the bite of said rollers, said teeth being arranged in different planes of rotation so that the teeth of one roller enter the spaces between the teeth of the other and pass the teeth of the other roller with small clearance upon rotation of said rollers, means for rotating said rollers about their longitudinal axes in the same direction but at different speeds, and rake means adapted to move material intercepted by said screen toward the bite of said rollers.

14. In an apparatus for intercepting solids in a flowing stream of liquid and comminuting them in said stream, including a screening wall interposed in said stream, a rake adapted to travel along said screening wall and move solids intercepted by said screening wall therealong, and means for cyclically reciprocating said rake along said screening wall, a comminutor positioned adjacent the lower end of travel of, and receiving said solids from, said rake, said comminutor comprising a pair of rollers, means for rotatably mounting said rollers with their longitudinal axes parallel to one another, spaced projections on the circumferences of said rollers, said projections being arranged in such planes of rotation and the axes of said rollers thus spaced from one another that no point of the profile of one of said rollers interferes with any point of the profile of the other roller during rotation of said rollers, drive means including a motor and a power circuit through said motor for rotating said rollers about their longitudinal axes in the same direction but at different speeds, a friction clutch interposed in the drive means of the faster roller, and an overload device connected to said friction clutch and adapted to disengage said clutch in response to overcurrent in said power circuit.

References Cited in the file of this patent

UNITED STATES PATENTS

| | | |
|---|---|---|
| 27,581 | Umholtz | Mar. 20, 1860 |
| 196,100 | Newell | Oct. 16, 1877 |
| 240,453 | Oexle | Apr. 19, 1881 |
| 818,328 | Williams | Apr. 17, 1906 |
| 1,460,569 | Brodesser | July 3, 1923 |
| 1,742,434 | Costello | Jan. 7, 1930 |
| 1,827,669 | Pender | Oct. 13, 1931 |
| 2,022,007 | Moore | Nov. 26, 1935 |
| 2,106,851 | Nordell | Feb. 1, 1938 |
| 2,198,943 | Lowe | Apr. 30, 1940 |
| 2,362,343 | Bath | Nov. 7, 1944 |
| 2,462,542 | Paetou | Feb. 22, 1949 |
| 2,518,119 | Breda | Aug. 8, 1950 |
| 2,533,550 | Blackwell | Dec. 12, 1950 |
| 2,577,173 | Worst | Dec. 4, 1951 |

FOREIGN PATENTS

| | | |
|---|---|---|
| 185,606 | Great Britain | Sept. 14, 1922 |